United States Patent [19]

Sommer

[11] Patent Number: 5,697,862
[45] Date of Patent: Dec. 16, 1997

[54] TWO-SPEED PRESS DRIVE

[75] Inventor: Gordon Maurice Sommer, Grosse Pointe Shores, Mich.

[73] Assignee: Midwest Brake Bond Company, Warren, Mich.

[21] Appl. No.: 594,783

[22] Filed: Jan. 31, 1996

[51] Int. Cl.⁶ .................................................. F16D 67/04
[52] U.S. Cl. .......................... 475/339; 192/18 A; 475/338
[58] Field of Search ................................... 475/338, 339; 192/18 A

[56] References Cited

U.S. PATENT DOCUMENTS

| | | |
|---|---|---|
| 2,918,832 | 12/1959 | Meyers . |
| 2,922,314 | 1/1960 | Johnson et al. . |
| 3,382,735 | 5/1968 | Gatiss . |
| 3,473,639 | 10/1969 | Becker et al. . |
| 3,487,726 | 1/1970 | Burnett . |
| 3,614,999 | 10/1971 | Sommer . |
| 3,713,517 | 1/1973 | Sommer . |
| 3,835,971 | 9/1974 | Spanke et al. . |
| 3,946,840 | 3/1976 | Sommer . |
| 4,135,611 | 1/1979 | Spanke . |
| 4,186,827 | 2/1980 | Spanke . |
| 4,296,650 | 10/1981 | Kalns . |
| 4,407,399 | 10/1983 | Wolff . |
| 4,432,443 | 2/1984 | Sommer . |
| 4,460,075 | 7/1984 | Sommer . |
| 4,472,077 | 9/1984 | Sommer . |
| 4,516,444 | 5/1985 | Herr, Jr. . |
| 4,552,255 | 11/1985 | Sommer . |
| 4,592,251 | 6/1986 | Mason . |
| 4,607,736 | 8/1986 | Kelley . |
| 4,644,819 | 2/1987 | Zugel . |
| 4,785,926 | 11/1988 | Matson . |
| 4,934,216 | 6/1990 | Sandel et al. ................... 475/346 X |
| 4,944,193 | 7/1990 | Harada et al. .................. 475/331 X |
| 4,961,485 | 10/1990 | Huff et al. ...................... 475/331 X |
| 5,190,129 | 3/1993 | Sommer . |
| 5,194,057 | 3/1993 | Sommer . |
| 5,195,623 | 3/1993 | Sommer . |
| 5,285,879 | 2/1994 | Sommer . |
| 5,323,888 | 6/1994 | Sommer . |
| 5,482,512 | 1/1996 | Stevenson .................... 475/269 X |
| 5,538,482 | 7/1996 | Tanzer et al. .................. 475/339 X |
| 5,540,120 | 7/1996 | Sommer ......................... 475/338 X |
| 5,547,431 | 8/1996 | Sommer ......................... 475/346 X |

*Primary Examiner*—Charles A. Marmor
*Assistant Examiner*—Peter T. Kwon
*Attorney, Agent, or Firm*—Harness, Dickey & Pierce

[57] ABSTRACT

A two-speed press drive is manufactured as a complete assembly eliminating the requirement that the drive be assembled at the location of the press. The two-speed drive includes a stationary quill, an output shaft and a planetary gear set. The planetary gear set includes a first sun gear connected to the stationary quill, a second sun gear rotatably connected to the stationary quill, a planetary gear carrier rotatably connected to the stationary quill and three compound planetary gears rotatably connected to the carrier and meshing with both the first and second sun gears. The input to the two-speed drive is through the planetary gear carrier. A high speed clutch connects the carrier directly to the output shaft for high speed operation. A low speed clutch connects the second sun gear to the output shaft for high speed operation. A housing in conjunction with the carrier define a sealed cavity within which the components of the drive operate.

13 Claims, 1 Drawing Sheet

5,697,862

TWO-SPEED PRESS DRIVE

FIELD OF THE INVENTION

The present invention relates to two-speed press drives. More particularly, the present invention relates to a unique multi-speed press drive which utilizes a compound planetary gear set in conjunction with a pair of oil shear clutches to provide a two-speed modular press drive which can be pre-assembled prior to being shipped to the press thereby eliminating the need to assemble the drive in the field.

BACKGROUND OF THE INVENTION

Drive systems for presses incorporating clutches, brakes and planetary gear sets are known well in the art and have been used successfully for many years. Some prior art designs of press drives have experienced problems with the braking and clutching systems as well as problems with the overall lubrication of the components of the press drive.

The operating problems of these prior art designs of press drives occur due to the utilization of a plurality of dry friction plates to hold and/or release the various members of the drive system. Due to the wear between these dry friction plates, the press drives required constant adjustment and replacement of the clutch and brake assemblies. Also during the operation of these dry clutch and brake assemblies, a significant amount of heat is generated. This generation of heat combined with the excessive wear of the friction plates causes fading of these prior art brake and/or clutch assemblies. In addition to the problems of excessive heat generation and excessive wear of the prior art clutch and brake assemblies is the problem associated with supplying an adequate amount of lubrication to the various components of the drive system.

Oil shear brakes and clutches have been developed to overcome the problems associated with these prior art designs of dry friction plate brakes and clutches. In an oil shear clutch or brake system, over 90% of the start/stop inertia is absorbed by a thin, but positive oil film between the friction plates. This thin oil film thus results in little or no wear between the plates and also no fading of the clutch and/or brake assemblies. The thin oil film between the friction plates is supplied by a recirculating oil system which thus allows the oil to remove the heat generated during the stop/start cycles of the press. With the elimination of the generated heat and wear from the friction plates, there is no longer a practical limit on the drive trip rate or speed.

The oil shear brake and clutch assemblies have also eliminated the problems associated with lubrication of the various components of the press drive. The press drive housing is now filled with recirculated lubricating oil for the oil shear brake and clutch assemblies. This recirculated lubricating oil is also utilized to lubricate the moving components of the press drive system including bearings, gear teeth and planetary gear systems.

Press drives incorporating oil shear brake and clutch assemblies have enjoyed wide acceptance in the press drive market. One of the problems associated with the oil shear press drives has been related to the assembly of these units to the press. This is especially true of the two-speed press drives which must become an integral part of the press. These oil shear press drives are normally provided as disassembled assemblies which then must be assembled to the press as individual components rather than as modular pre-assembled assemblies. This requirement of assembly at the press can lead to difficulties in maintaining the accuracy and quality of the finished drive. This is especially true in retro-fitting applications which require the assembly of the press drive at the manufacturing site of the press.

Accordingly, the continued development of press drives is directed towards a more compact and lower cost drive system which includes the ability to be pre-assembled as a complete assembly prior to being shipped to the press. These unique two-speed drive systems must provide the modular pre-assembly features without compromising the durability and/or performance characteristics of the drive system.

SUMMARY OF THE INVENTION

The present invention provides the art with a two-speed drive system which uses an oil shear brake and a pair of oil shear clutches in conjunction with a planetary gear train. The planetary gear train has a pair of sun gears and a compound planetary gear set. This configuration of the planetary gear train along with a stationary quill permit the two-speed drive to be completely pre-assembled in modular form prior to being shipped to the press. This eliminates any field assembly of the two-speed drive.

Other advantages and objects of the present invention will become apparent to those skilled in the art from the subsequent detailed description, appended claims and drawing.

BRIEF DESCRIPTION OF THE DRAWING

In the drawing which illustrates the best mode presently contemplated for carrying out the present invention.

DETAILED DESCRIPTION OF THE PREFERRED EMBODIMENT

Figure 1:
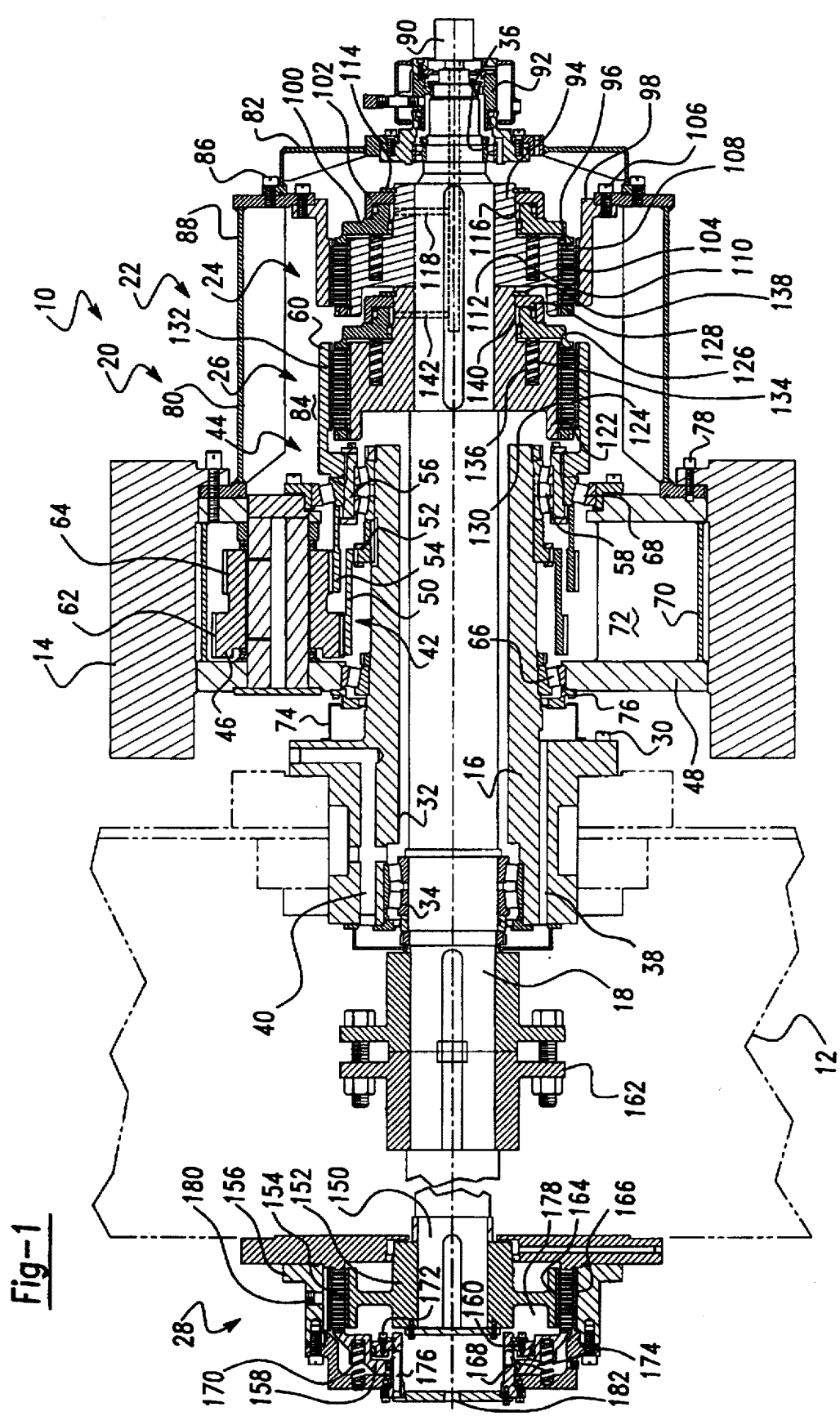
FIG. 1 is a side elevational view, partially in cross section, of a two-speed drive system in accordance with the present invention.

Referring now to the drawing there is shown in FIG. 1 a two-speed drive in accordance with the present invention which is designated generally by the reference numeral 10. Two-speed drive 10 is shown in FIG. 1 as assembled to a press 12 which includes a rotating flywheel 14. Two-speed drive 10 comprises a stationary quill 16, an output shaft 18, planetary gear set 20, a housing assembly 22, a high speed oil shear clutch 24, a low speed oil shear clutch 26, and an oil shear brake assembly 28.

Stationary quill 16 is fixedly secured to a stationary member of press 12 by a plurality of bolts 30 to mount press drive 10 to press 12. Quill 16 is a generally tubular member having a central through bore 32 within which output shaft 18 is rotatably mounted with respect to quill 16 using a bearing 34 and output shaft 18 is rotatably mounted with respect to housing assembly 22 using a bearing 36. Output shaft 18 extends outward of quill 16 at a first end to provide for the mounting of clutches 24 and 26 and output shaft 18 extends outward of quill 16 at the opposite end to provide for the mounting of brake assembly 28 as will be described later herein., Quill 16 defines a lower oil passage 38 which directs lubricating/cooling oil to bearing 34 and quill 16 defines an upper oil passage 40 which is utilized to return lubricating/cooling oil to a recirculating oil supply system (not shown).

Planetary gear set 20 comprises a first sun gear 42, a second sun gear 44, three compound planet gears 46 meshingly engaging both sun gears 42 and 44, and a planetary gear carrier 48. First sun gear 42, as shown in FIG. 1, is a two piece assembly having a gear section 50 which meshingly engages the three planet gears 46 and a mounting section 52 which is fixedly secured to output shaft 18 for rotation therewith. Thus, first sun gear 42 rotates with output shaft 18.

Second sun gear 44, as shown in FIG. 1, is a three piece assembly having a gear section 54 which meshingly engages the three planet gears 46, a bearing mounting section 56 for rotatably mounting sun gear 42 with respect to quill 16 using a bearing 56 and a low speed clutch section 60 which forms a portion of low speed clutch 26. Each planet gear 46 (only one being shown in FIG. 1) is rotatably supported within carrier 48 by methods known well in the art. The mounting system for gears 46 includes a series of oil passages to lubricate the bearings which mount gears 46. Each planet gear 46 includes a first set of gear teeth 62 which meshes with first sun gear 42 and a second set of gear teeth 64 which meshes with second sun gear 44.

Planetary gear carrier 48 is rotatably mounted with respect to quill 16 by a bearing 66 and rotatably mounted with respect to second sun gear 44 by a bearing 68. Carrier 48 includes a cylindrical wall 70 which is secured to the outer portion of carrier 48 to define a sealed cavity 72 within which gears 42, 44 and 46 are disposed. Cavity 72 is partially filled with lubricating/cooling oil from the oil recirculating system and this oil provides lubrication for the bearings and gears associated With planetary gear set 20. A bearing retainer and seal assembly 74 is secured to carrier 48 by a plurality of bolts 76. Assembly 74 provides for the mounting of bearing 66 as well as the sealing for cavity 72. Flywheel 14 is fixedly secured to planetary gear carrier 48 by a plurality of bolts 78 for rotation with carrier 48. Thus, flywheel 14 provides the rotational input to two-speed drive 10 through planetary gear carrier 48 of planetary gear set 20.

Housing assembly 22 is fixedly secured to gear carrier 48 and flywheel 14 by the plurality of bolts 78. Thus, housing assembly 22 rotates with flywheel 14 with bearing 36 providing for the rotation of housing assembly 22 with respect to output shaft 18. Housing assembly 22 comprises a generally cylindrical section 80 and an end cap assembly 82. Cylindrical section 80 defines a cavity 84 within which is located clutches 24 and 26. Cavity 84 is in communication with cavity 72 and is also partially filled with lubricating/cooling oil from the oil recirculation system. This oil provides the lubrication for the components associated with clutches 24 and 26 as well as the components associated with housing assembly 22. End cap assembly 82 is fixedly and sealingly secured to section 80 using a plurality of bolts 86. A seal 88 seals the interface between section 80 and end cap assembly 82. End cap assembly 82 isolates cavity 84 such that it can be filled with lubricating/cooling oil and provides for the mounting of bearing 36 which allows rotation between output shaft 18 and housing assembly 22. A dual rotary union 90 is secured to the end of output shaft 18 which extends beyond housing assembly 22. Union 90 provides for the routing of pressurized fluid to operate clutches 24 and 26 as will be described later herein. In addition, an adapter 92 is also secured to the end of output shaft 18 which extends beyond housing assembly 22 to provide for the routing of lubrication/cooling oil from the oil recirculation system into cavity 84, into cavity 72, through bore 32 and back to the recirculation system via upper oil passage 40. Thus, the moving components of drive 10 are continuously fed a recirculating supply of lubricating/cooling oil.

High speed oil shear clutch 24 comprises a hub 94, a plurality of friction plates 96, a reaction member 98, an engagement member 100 and a retainer 102. Hub 94 is fixedly secured to output shaft 18 for rotation therewith. Hub 94 defines a plurality of teeth 104 located on an outer surface of hub 94. Every other, or approximately ½, of the plurality of friction plates 96 have a plurality of teeth on their inside diameter which mate with teeth 104 such that the approximately ½ of friction plates 96 rotate with hub 94 but are allowed to move axially along teeth 104. Reaction member 98 is fixedly secured to housing assembly 22 by a plurality of bolts 106. Reaction member 98 defines a plurality of teeth 108 on an internal surface. Every other or the remaining ½ of friction plates 96 have a plurality of teeth on their outside diameter which mate with teeth 108 such that the remaining ½ of friction plates 96 rotate with reaction member 98 and housing assembly 22 but are allowed to move axially along teeth 108. Thus, the plurality of friction plates 96 are interleaved between hub 94 and reaction member 98 with adjacent plates being alternately splined to hub 94 and reaction member 98.

Engagement member 100 is slidingly disposed upon hub 94 and moves axially with respect to hub 94 and reaction member 98 to compress the plurality of friction plates 96 together to lock housing assembly 22 to output shaft 18. A plurality of springs 110 are disposed within a plurality of bores 112 located within hub 94 to bias engagement member 100 away from plates 96 or into a disengaged condition for clutch 24. Retainer 102 is connected to hub 94 by a snap ring 114 to limit the movement of engagement member 100 in the direction away from plates 96. Retainer 102, hub 94 and engagement member 100 cooperate to define a chamber 116 which receives pressurized fluid through a passageway 118 extending through output shaft 18 and into union 90. A series of seals isolate chamber 116 from cavity 84.

Clutch 24 is normally biased into a disengaged condition by springs 110 which bias engagement member 100 away from plates 96. This allows plates 96 attached to housing assembly 22 to rotate with respect to plates 96 attached to hub 94. Flywheel 14 is thus free to rotate relative to output shaft 18. When it is desired to lock flywheel 14 to output shaft 18, pressurized fluid is supplied to chamber 116 through passageway 118 through rotary union 90 to move engagement member 100 to the left as shown in FIG. 1 against the load exerted by springs 110. This movement causes compression between adjacent plates 96 and housing assembly 22 becomes locked to hub 94 which locks flywheel 14 to output shaft 18 for rotation therewith. Release of the pressurized fluid from chamber 116 allows springs 110 to return clutch 24 to its disengaged condition.

Low speed oil shear clutch 26 comprises a hub 122, a plurality of friction plates 124, low speed clutch section 60 of second sun gear 44, an engagement member 126 and a retainer 128. Hub 122 is fixedly secured to output shaft 18 for rotation therewith. Hub 122 defines a plurality of teeth 130 located on an outer surface of hub 122. Every other, or approximately ½, of the plurality of friction plates 124 have a plurality of teeth on their inside diameter which mate with teeth 130 such that the approximately ½ of friction plates 124 rotate with hub 122 but are allowed to move axially along teeth 130. Section 60 of second sun gear 44 defines a plurality of teeth 132 on an internal surface. Every other or the remaining ½ of plates 124 have a plurality of teeth on their outside diameter which mate with teeth 132 such that the remaining ½ of plates 124 rotate with sun gear 44 but are allowed to move axially along teeth 132. Thus, the plurality of friction plates 124 are interleaved between hub 122 and second sun gear 44 with adjacent plates being alternately splined to hub 122 and second sun gear 44.

Engagement member 126 is slidingly disposed upon hub 122 and moves axially with respect to hub 122 and second sun gear 44 to compress the plurality of friction plates 124 together to lock second sun gear 44 to output shaft 18. A plurality of springs 134 are disposed within a plurality of bores 136 to bias engagement member 126 away from plates 124 or into a disengaged condition for clutch 26. Retainer 128 is connected to hub 122 by a snap ring 138 to limit the movement of engagement member 126 in the direction away from plates 124. Retainer 128, hub 122 and engagement member 126 cooperate to define a chamber 140 which receives pressurized fluid through a passageway 142 extending through output shaft 18 and into union 90. A series of seals isolate chamber 140 from cavity 84, Clutch 26 is normally biased into a disengaged condition by springs 134 which bias engagement member 126 away from plates 124. This allows plates 124 attached to sun gear 44 to rotate with respect to plates 124 attached to hub 122. Second sun gear 44 is thus free to rotate relative to output shaft 18. When it is desired to lock second sun gear 44 to output shaft 18, pressurized fluid is supplied to chamber 140 through passageway 142 through rotary union 90 to move engagement member 126 to the left as shown in FIG. 1 against the load exerted by springs 134, This movement causes compression between adjacent plates 124 and second sun gear 44 becomes locked to hub 122 which locks second sun gear 44 to output shaft 18 for rotation therewith. Release of pressurized fluid from chamber 140 allows springs 134 to return clutch 26 to its disengaged condition.

Oil shear brake assembly 28 is utilized to prohibit rotation of output shaft 18 and is comprised of a driveshaft 150, a hub 152, a plurality of friction plates 154, a housing assembly 156, an application member 158 and a retainer 160. Driveshaft 150 is secured for rotation with output shaft 18 through a flanged coupling 162. Hub 152 is fixedly secured to driveshaft 150 for rotation therewith. Hub 152 defines a plurality of teeth 164 located on an outer surface of hub 152. Every other, or approximately ½, of the plurality of friction plates 154 have a plurality of teeth on their inside diameter which mate with teeth 164 such that the approximately ½ of friction plates 154 rotate with hub 152 but are allowed to move axially along teeth 164. Housing assembly 156 is fixedly secured to a stationary member of press 12 and defines a plurality of teeth 166 on an internal surface. Every other or the remaining ½ of plates 154 have a plurality of teeth on their outside diameter which mate with teeth 166 such that the remaining ½ of plates 154 are rotationally locked to the stationary member of press 12 but are allowed to move axially along teeth 166. Thus, the plurality of friction plates 154 are interleaved between hub 152 and housing assembly 156 with adjacent plates being alternately splined to hub 152 and housing assembly 156.

Application member 156 is slidingly disposed within housing assembly 156 and moves axially with respect to hub 152 and housing assembly 156 to compress the plurality of friction plates 154 together to lock driveshaft 150 and thus output shaft 18 to the stationary member of press 12. A plurality of springs 168 are disposed within a plurality of bores 170 to bias application member 158 towards plates 154 or into an applied condition for brake assembly 28. Retainer 160 is connected to housing assembly 156 by a ring 172. Retainer 160, hub 152 and application member 158 cooperate to define a chamber 174 which receives pressurized fluid through a passageway 176 extending through housing assembly 156. A series of seals isolate chamber 140 from a cavity 178 formed by housing assembly 156. Cavity 178 is partially filled with recirculated lubricating/cooling oil through an inlet port 180 extending through housing assembly 156 and an outlet port 182 also extending through housing assembly 156 from the oil recirculation system for press 12. The lubricating/cooling oil provides lubrication for the moving components of brake assembly 28 as well as providing cooling oil for assembly 28.

Brake assembly 28 is normally biased into an applied condition by springs 168 which bias application member 158 towards plates 154. This prohibits rotation of output shaft 18 of drive 10 by locking output shaft 18 to the stationary member of press 12. When it is desired to release brake assembly 28 and permit rotation of output shaft 18, pressurized fluid is supplied to chamber 174 through passageway 176 to move application member 158 to the left as shown in FIG. 1 against the load exerted by springs 168. This movement causes a release of the compressive load being exerted on plates 154 by springs 168 thus permitting rotation of plates 154 attached to hub 152 with respect to plates 154 attached to housing assembly 156. Output shaft 18 is free to rotate with respect to the stationary component of press 12. Release of the pressurized fluid from chamber 174 allows springs 168 to return brake assembly 28 into its applied condition.

Operation of press drive 10 begins by having flywheel 14 rotating and output shaft 18 being held stationary. This is achieved by removing pressurized fluid from chamber 116 to disengage clutch 24, removing pressurized fluid from chamber 140 to disengage clutch 26 and removing pressurized fluid from chamber 174 to apply brake assembly 28.

Low speed operation of press drive 10 is achieved by supplying pressurized fluid to chamber 174 to release brake assembly 28 and supplying pressurized fluid to chamber 140 to engage clutch 26. Pressurized fluid is released from chamber 116 (or never supplied to chamber 116) to place clutch 24 in its disengaged condition. Rotation of flywheel 14 is transferred to planetary gear carrier 48 which rotates around first sun gear 42 due to the fact that first sun gear 42 is locked to stationary quill 16. This rotation of gear carrier 48 causes rotation of planet gears 46 which in turn cause. rotation of second sun gear 44 which is locked to output shaft 18 by clutch 26. The amount of speed reduction achieved will be determined by the ratio of teeth between first sun gear 42, second sun gear 44 and gear teeth 62 and 64 of planet gears 46 as is well known in the art.

High speed operation of press drive 10 is achieved by supplying pressurized fluid to chamber 174 to release brake assembly 28 and supplying pressurized fluid to chamber 116 to engage clutch 24. Pressurized fluid is released from chamber 140 (or never supplied to chamber 140) to place clutch 26 in its disengaged condition. Rotation of flywheel 14 is transferred directly to output shaft 18 through clutch 24 to provide high speed operation of press drive 10. During this direct drive or high speed operation of press drive 10, planet gear carrier 48 rotates around first sun gear 42 due to the fact that first sun gear 42 is locked to stationary quill 16. This rotation of gear carrier 48 causes rotation of planet gears 46 which in turn cause rotation of second sun gear 44. Second sun gear 44 is free to rotate relative to output shaft 18 due to the disengaged condition of clutch 26.

While the above detailed description describes the preferred embodiment of the present invention, it should be understood that the present invention is susceptible to modification, variation and alteration without deviating from the scope and fair meaning of the subjoined claims.

What is claimed is:

1. A two-speed drive comprising:
   a stationary quill;
   an input member for transmitting rotation to said two-speed drive, said input member being rotatably disposed with respect to said quill;
   an output member for transmitting rotation from said two-speed drive, said output member being rotatably disposed with respect to said quill;

a brake for selectively locking said output member to said stationary quill;

a planetary gear set disposed between said input member and said output member, said planetary gear set comprising:

a first sun gear fixedly secured to said quill;

a second sun gear rotatably disposed with respect to said quill; and a plurality of compound planet gears rotatably disposed with respect to said input member, each of said plurality of compound planet gears meshingly engaging said first and second sun gears.

2. The two-speed drive according to claim 1 further comprising a low speed clutch for selectively locking said second sun gear to said output member.

3. The two-speed clutch according to claim 2 further comprising a high speed clutch for selectively locking said input member to said output member.

4. The two-speed clutch according to claim 1 further comprising a high speed clutch for selectively locking said input member to said output member.

5. A two-speed drive for a press having a flywheel, a stationary frame and a driveshaft, said two-speed drive comprising:

a quill connected to said frame;

an output member for transmitting rotation from said two-speed drive to said driveshaft of said press, said output member being rotatably disposed with respect to said quill;

a planetary gear set disposed between said flywheel of said press and said output member, said planetary gear set comprising:

a first sun gear fixedly secured to said quill;

a second sun gear rotatably disposed with respect to said quill;

a planetary gear carrier secured to said flywheel and rotatably disposed with respect to said quill;

a plurality of compound planet gears rotatably disposed with respect to said planetary gear carrier, each of said plurality of compound planet gears meshingly engaging said first and second sun gears.

6. The two-speed drive according to claim 5 further comprising a low speed clutch for selectively locking said second sun gear to said output member.

7. The two-speed clutch according to claim 6 further comprising a high speed clutch for selectively locking said planetary gear carrier to said output member.

8. The two-speed drive according to claim 7 further comprising a housing, said housing and said planetary gear carrier defining a sealed cavity within which is disposed said first and second sun gears, said planetary gears, said low speed clutch and said high speed clutch.

9. The two-speed clutch according to claim 7 further comprising a brake for selectively locking said output member to said frame of said press.

10. The two-speed clutch according to claim 5 further comprising a high speed clutch for selectively locking said planetary gear carrier to said output member.

11. The two-speed drive according to claim 10 further comprising a housing, said housing and said planetary gear carrier defining a sealed cavity within which is disposed said first and second sun gears, said planetary gears and said high speed clutch.

12. The two-speed clutch according to claim 10 further comprising a brake for selectively locking said output member to said frame of said press.

13. The two-speed clutch according to claim 5 further comprising a brake for selectively locking said output member to said frame of said press.

* * * * *

UNITED STATES PATENT AND TRADEMARK OFFICE
CERTIFICATE OF CORRECTION

PATENT NO. : 5,697,862

DATED : December 16, 1997

INVENTOR(S) : Gordon M. Sommer

It is certified that error appears in the above-identified patent and that said Letters Patent is hereby corrected as shown below:

Col. 1, line 24, delete "required" and substitute --require-- therefor

Col. 2, line 55, delete "herein.," and substitute --herein.-- therefor

Col. 3, line 5, "bearing 56" should be --bearing 58--

Col. 3, line 22, "With" should be --with--

Col. 5, line 18, "springs 134," should be --spring 134.--

Col. 5, line 47, "member 156" should be --member 158--

Col. 6, line 33, "cause." should be --cause--

Signed and Sealed this

Fourteenth Day of April, 1998

Attest:

BRUCE LEHMAN

Attesting Officer

Commissioner of Patents and Trademarks